US012525755B2

(12) United States Patent
Brungard et al.

(10) Patent No.: US 12,525,755 B2
(45) Date of Patent: Jan. 13, 2026

(54) POWER CONNECTOR FOR COMPACT ELECTRONIC SYSTEMS

(71) Applicant: FCI USA LLC, Etters, PA (US)

(72) Inventors: Thomas A. Brungard, York, PA (US); Steven E. Pressel, Harrisburg, PA (US)

(73) Assignee: FCI USA LLC, Etters, PA (US)

(*) Notice: Subject to any disclaimer, the term of this patent is extended or adjusted under 35 U.S.C. 154(b) by 661 days.

(21) Appl. No.: 17/867,647

(22) Filed: Jul. 18, 2022

(65) Prior Publication Data

US 2023/0013728 A1 Jan. 19, 2023

Related U.S. Application Data

(60) Provisional application No. 63/223,527, filed on Jul. 19, 2021.

(51) Int. Cl.
*H01R 13/20* (2006.01)
*H01R 12/55* (2011.01)
(Continued)

(52) U.S. Cl.
CPC .......... *H01R 13/665* (2013.01); *H01R 12/55* (2013.01); *H01R 12/716* (2013.01);
(Continued)

(58) Field of Classification Search
CPC .... H01R 13/665; H01R 12/55; H01R 12/716; H01R 13/111; H01R 24/86; H01R 43/20
(Continued)

(56) References Cited

U.S. PATENT DOCUMENTS 4,106,839 A 8/1978 Cooper
4,377,320 A 3/1983 Lathrop
(Continued)

FOREIGN PATENT DOCUMENTS

CN 2508422 Y 8/2002
CN 2520579 Y 11/2002
(Continued)

OTHER PUBLICATIONS

Chinese Office Action dated Jan. 3, 2025 in connection with Chinese Application No. 202280058950.2.
(Continued)

*Primary Examiner* — Tulsidas C Patel
*Assistant Examiner* — Thaslimur Rahman
(74) *Attorney, Agent, or Firm* — Wolf, Greenfield & Sacks, P.C.

(57) ABSTRACT

Flexible and low cost power interconnects. The interconnect includes a plug with an insulative support and a plurality of electrical contacts mounted to exterior surfaces of the insulative support. The plug may be simply formed with molding and stamping operations. In use, the plug may be connected in an electrical assembly to support one or multiple power circuits in a compact space. A receptacle for receiving the plug may have an opening with sides bounded by rows of independent electrical contacts that may similarly be connected to one or more power circuits within a printed circuit board to which the receptacle is mounted. The plug and receptacle may be configured such that, when the receptacle connector and plug are each mounted to substrates and the connectors are mated, the substrates are spaced 6 mm, 5 mm, or less.

21 Claims, 8 Drawing Sheets

(51) Int. Cl.

| | |
|---|---|
| ***H01R 12/71*** | (2011.01) |
| ***H01R 13/11*** | (2006.01) |
| ***H01R 13/66*** | (2006.01) |
| ***H01R 24/86*** | (2011.01) |
| ***H01R 43/20*** | (2006.01) |

(52) U.S. Cl.
CPC ........... *H01R 13/111* (2013.01); *H01R 24/86* (2013.01); *H01R 43/20* (2013.01)

(58) Field of Classification Search
USPC .......................................................... 439/626
See application file for complete search history.

(56) References Cited

U.S. PATENT DOCUMENTS

| | | | | |
|---|---|---|---|---|
| 4,891,476 | A | 1/1990 | Nation | |
| 5,024,609 | A * | 6/1991 | Piorunneck .......... | H01R 12/721 439/924.1 |
| 5,259,795 | A | 11/1993 | Yamada et al. | |
| 5,667,393 | A * | 9/1997 | Grabbe .................. | H01R 13/41 600/443 |
| 5,911,595 | A | 6/1999 | Orr, Jr. et al. | |
| 5,997,367 | A | 12/1999 | Nowak | |
| 6,010,369 | A | 1/2000 | Itabashi | |
| 6,135,785 | A | 10/2000 | Niitsu | |
| 6,139,351 | A | 10/2000 | Schaefer et al. | |
| 6,425,766 | B1 | 7/2002 | Panella | |
| 6,450,829 | B1 | 9/2002 | Weisz-Margulescu | |
| 6,461,174 | B1 | 10/2002 | Hwang | |
| 6,623,277 | B1 | 9/2003 | Zhu et al. | |
| 7,008,235 | B2 | 3/2006 | Watanabe | |
| 7,413,456 | B1 | 8/2008 | DiFusco | |
| 7,597,580 | B1 | 10/2009 | Advey et al. | |
| 8,057,263 | B1 | 11/2011 | Howard et al. | |
| 8,061,862 | B2 | 11/2011 | Cho et al. | |
| 8,376,766 | B1 | 2/2013 | Huettner et al. | |
| 8,435,077 | B2 | 5/2013 | Yang | |
| 8,708,714 | B2 | 4/2014 | Niitsu | |
| 8,783,368 | B2 | 7/2014 | Eriksen | |
| 9,004,946 | B2 | 4/2015 | Hoeppner | |
| 9,040,846 | B2 | 5/2015 | Suzuki et al. | |
| 9,083,107 | B2 | 7/2015 | Suzuki et al. | |
| 9,190,770 | B2 | 11/2015 | Shindo et al. | |
| 9,263,199 | B2 | 2/2016 | Reuber | |
| 9,325,095 | B2 | 4/2016 | Glick | |
| 9,455,523 | B1 | 9/2016 | Sundarakrishnamachari et al. | |
| 9,559,467 | B1 | 1/2017 | Khorrami et al. | |
| 9,601,856 | B2 | 3/2017 | Regantini | |
| 9,711,299 | B2 | 7/2017 | Cortinovis | |
| 10,312,647 | B2 | 6/2019 | Copper et al. | |
| 10,862,253 | B2 | 12/2020 | Copper et al. | |
| 11,616,329 | B2 | 3/2023 | Copper et al. | |
| 2003/0186595 | A1 | 10/2003 | Provencher et al. | |
| 2004/0229484 | A1 | 11/2004 | Uchida | |
| 2005/0037655 | A1 | 2/2005 | Henry et al. | |
| 2007/0105441 | A1 | 5/2007 | Shen et al. | |
| 2008/0242148 | A1 | 10/2008 | Omura et al. | |
| 2008/0267617 | A1* | 10/2008 | Huang ................... | G03B 17/02 396/542 |
| 2009/0197482 | A1 | 8/2009 | Mark | |
| 2009/0252489 | A1 | 10/2009 | Huang | |
| 2009/0318023 | A1 | 12/2009 | Block | |
| 2010/0081336 | A1 | 4/2010 | Hemmi et al. | |
| 2010/0144172 | A1 | 6/2010 | Pavlovic | |
| 2010/0273345 | A1 | 10/2010 | Gong | |
| 2011/0097945 | A1 | 4/2011 | Costello et al. | |
| 2011/0155458 | A1 | 6/2011 | Kato et al. | |
| 2011/0159709 | A1 | 6/2011 | Polnyi | |
| 2011/0237101 | A1 | 9/2011 | Yang | |
| 2012/0028501 | A1 | 2/2012 | Cheng | |
| 2012/0089203 | A1 | 4/2012 | Shaffer | |
| 2012/0122339 | A1 | 5/2012 | Taguchi | |
| 2012/0208403 | A1 | 8/2012 | Hino | |
| 2012/0228097 | A1 | 9/2012 | Gemme et al. | |
| 2013/0210292 | A1 | 8/2013 | Schmidt | |
| 2013/0303033 | A1 | 11/2013 | Rong et al. | |
| 2014/0120763 | A1 | 5/2014 | Itsuki et al. | |
| 2014/0154912 | A1 | 6/2014 | Hirschy | |
| 2014/0273628 | A1 | 9/2014 | de Chazal | |
| 2015/0132991 | A1 | 5/2015 | Crozier et al. | |
| 2016/0211057 | A1 | 7/2016 | Peterson et al. | |
| 2016/0329651 | A1 | 11/2016 | Yamaguchi et al. | |
| 2017/0310024 | A1 | 10/2017 | Adam | |
| 2017/0338606 | A1* | 11/2017 | Copper ................ | H01R 12/716 |
| 2018/0023981 | A1 | 1/2018 | Forwerck et al. | |
| 2018/0172141 | A1 | 6/2018 | Craft et al. | |
| 2018/0358731 | A1 | 12/2018 | Endo et al. | |
| 2019/0027871 | A1 | 1/2019 | Data et al. | |
| 2019/0044277 | A1 | 2/2019 | Mellott et al. | |
| 2019/0173221 | A1 | 6/2019 | de Chazal et al. | |
| 2019/0288466 | A1 | 9/2019 | Copper et al. | |
| 2021/0194192 | A1 | 6/2021 | Copper et al. | |
| 2022/0018215 | A1 | 1/2022 | Brackin et al. | |

FOREIGN PATENT DOCUMENTS

| | | | | |
|---|---|---|---|---|
| CN | 200965632 | Y | 10/2007 | |
| CN | 101505017 | A | 8/2009 | |
| CN | 101572359 | A | 11/2009 | |
| CN | 101621168 | A | 1/2010 | |
| CN | 201430276 | Y | 3/2010 | |
| CN | 101764294 | A | 6/2010 | |
| CN | 102157809 | A | 8/2011 | |
| CN | 201985279 | U | 9/2011 | |
| CN | 102315535 | A | 1/2012 | |
| CN | 102544836 | A | 7/2012 | |
| CN | 107112674 | A | 8/2017 | |
| CN | 109428209 | A * | 3/2019 | ............. H01R 13/50 |
| CN | 109428209 | B | 5/2020 | |
| KR | 10-2011-0103901 | A | 9/2011 | |
| TW | M245634 | U | 10/2004 | |
| WO | WO 2011/012891 | A2 | 2/2011 | |
| WO | WO 2016/069570 | A2 | 5/2016 | |

OTHER PUBLICATIONS

Chinese Office Action for Chinese Application No. 201580069759.8 dated Aug. 3, 2018.
Chinese Office Action for Chinese Application No. 201580069759.8 dated May 24, 2019.
Chinese Office Action for Chinese Application No. 202010928319.6 dated Jun. 23, 2021.
Chinese Office Action dated May 7, 2022 in connection with Chinese Application No. 202010928319.6.
Communication pursuant to Article 94(3) EPC for European Application No. 15790778.3 dated May 22, 2019.
International Search Report and Written Opinion for International Application No. PCT/US2015/057527 dated May 19, 2016.
International Preliminary Report on Patentability for International Application No. PCT/US2015/057527 mailed May 11, 2017.
International Search Report and Written Opinion mailed Nov. 8, 2022 in connection with International Application No. PCT/US2022/037558.
Extended European Search Report dated Apr. 22, 2025 in connection with European Application No. 22846493.9.

* cited by examiner

POWER CONNECTOR FOR COMPACT ELECTRONIC SYSTEMS

CROSS-REFERENCE TO RELATED APPLICATIONS

This application claims priority to and the benefit of U.S. Provisional Application Ser. No. 63/223,527, filed on Jul. 19, 2021, entitled "POWER CONNECTOR FOR COMPACT ELECTRONIC SYSTEMS," the contents of which are incorporated herein by reference in their entirety

BACKGROUND

The disclosure relates generally to interconnection systems, such as those including electrical connectors, used to interconnect electrical assemblies. For example, electrical connectors may be used to transfer electrical power between electrical assemblies.

To make this power transfer, a receptacle connector may be mounted to a printed circuit board in a first of the electrical assemblies. Electrical contacts within the receptacle connector may be attached to a power circuit within that printed circuit board. A metal post may be connected to a power circuit in the second assembly and may similarly be connected to the power circuit within the second assembly. To connect the first and second assemblies and complete the power circuit, the post may be inserted into receptacle such that the electrical contacts press against the post. An example of such a power connector is shown in WO 2016/069570.

SUMMARY

According to aspects of the disclosure, there is an electrical connector comprising a housing and a plurality of electrical contacts supported by the housing. The plurality of electrical contacts comprise a first row of electrical contacts arranged along a first line and a second row of electrical contacts arranged along a second line, wherein the second line is transverse to the first line.

In some embodiments, the housing comprises an opening, the electrical contacts of the first row comprise mating contact portions extending into the opening, and the electrical contacts of the second row comprise mating contact portions extending into the opening.

In some embodiments, the opening is rectangular.

In some embodiments, the opening is square.

In some embodiments, a surface of the opening has a curvature.

In some embodiments, the electrical connector is configured to be mounted to substrate having a first side and a second side and the plurality of electrical contacts are configured to extend from first side of the substrate to the second side of substrate when the electrical connector is mounted to the substrate.

In some embodiments, each electrical contact of the plurality of electrical contacts comprises a mounting portion and a mating portion, the mounting portion of each electrical contact is mounted to the first size of the substrate, and the mating portion of each electrical contact is arranged on the second side of the substrate.

In some embodiments, each electrical contact of the plurality of electrical contacts comprises a mounting portion and a mating portion, and the mounting portion of each electrical contact and the mating portion of each electrical contact face the same direction.

In some embodiments, the electrical connector is configured to be mounted to a first substrate, the electrical connector is configured to mate with a complementary electrical connector mounted to a second substrate, and the electrical connector is configured to space the first substrate 6 mm or less from the second substrate when the electrical connector is mated with the complementary electrical connector.

In some embodiments, the first line is perpendicular to the second line.

In some embodiments, the plurality of electrical contacts supported by the housing further comprises a third row of electrical contacts arranged along a third line, wherein the third line is transverse to the second line and a fourth row of electrical contacts arranged along a fourth line, wherein the fourth line is transverse to third line and transverse to the first line.

In some embodiments, the first row of electrical contacts, the second row of electrical contacts, the third row of electrical contacts, and the fourth row of electrical contacts form a rectangle.

In some embodiments, the first row of electrical contacts, the second row of electrical contacts, the third row of electrical contacts, and the fourth row of electrical contacts form a square.

In some embodiments, the plurality of electrical contacts comprise stamped metal electrical contacts.

In some embodiments, the first row of electrical contacts are coupled to a first electrical power circuit and the second row of electrical contacts are coupled to a second electrical power circuit, wherein the second electrical power circuit is different than the first electrical power circuit.

In some embodiments, the first row of electrical contacts are configured to pass a first current at a first voltage of the first electrical power circuit and the second row of electrical contacts are configured to pass a second current at a second voltage of the second electrical circuit, wherein the second current is different than the first current and/or the second voltage is different than first voltage.

In some embodiments, the electrical connector comprises a power connector.

In some embodiments, the housing comprises an opening and the first row of electrical contacts and the second row of electrical contacts are arranged about a perimeter of the opening.

According to aspects of the disclosure, there is provided an electrical connector, comprising a housing comprising an opening bounded by at least a first straight wall and a second straight wall transverse to the first straight wall and a plurality of electrical contacts supported by the housing and comprising a mating contact portion. The plurality of electrical contacts comprise a first electrical contact mounted to the first straight wall with the mating contact portion of the first electrical contact extending into the opening and a second electrical contact mounted to the second straight wall with the mating contact portion of the second electrical contact extending into the opening.

In some embodiments, the housing comprises a base and the first straight wall and the second straight wall extend from the base.

In some embodiments, the first electrical contact and the second electrical contact each comprise a tail configured for connection to a printed circuit board and a mating contact portion configured for contacting a plug inserted in the opening and the contact tails of the first electrical contact and the second electrical contact extend from the base.

In some embodiments, the opening has a center and the first straight wall and the second straight wall are inclined towards the center of the opening.

In some embodiments, the electrical connector is configured to be mounted to a first substrate, the electrical connector is configured to mate with a complementary electrical connector mounted to a second substrate, and the electrical connector is configured to space the first substrate 6 mm or less from the second substrate when the electrical connector is mated with the complementary electrical connector.

In some embodiments, the first line is perpendicular to the second line.

In some embodiments, the plurality of electrical contacts supported by the housing further comprises a third electrical contact arranged along a third line, wherein the third line is transverse to the second line and a fourth electrical contact arranged along a fourth line, wherein the fourth line is transverse to the third line and transverse to the first line.

In some embodiments, the first electrical contact, the second electrical contact, the third electrical contact, and the fourth electrical contact form a rectangle.

In some embodiments, the first electrical contact, the second electrical contact, the third electrical contact, and the fourth electrical contact form a square.

In some embodiments, the plurality of electrical contacts comprise stamped metal electrical contacts.

In some embodiments, the first electrical contact is coupled to a first electrical power circuit and the second electrical contact is coupled to a second electrical power circuit, wherein the second electrical power circuit is different than the first electrical power circuit.

In some embodiments, the first electrical contact is configured to transmit a first current and a first voltage of the first electrical power circuit and the second electrical contact is configured to transmit a second current and a second voltage of the second electrical circuit, wherein the second current is different than the first current and/or the second voltage is different than first voltage.

In some embodiments, the electrical connector comprises a power connector.

In some embodiments, the first electrical contact and the second electrical contact are arranged about a perimeter of the housing.

In some embodiments, each of the first electrical contact and the second electrical contact comprise is a unitary plate.

According to aspects of the disclosure, there is provided an electrical connector, comprising an insulative support comprising a central axis and an exterior, a plurality of contacts attached to the exterior of the insulative support, wherein each of the plurality of contacts comprises a contact surface facing away from the central axis and at least one contact tail.

In some embodiments, the insulative support is elongated in a first direction, each of the plurality of contacts comprises a body comprising the contact surface, and the at least one contact tail of each of the plurality of contacts extends from the body in the first direction.

In some embodiments, the insulative support comprises a first end and a second end, opposite from the first end along the first direction, the first end of the insulative support comprises a mounting lug configured for mounting to a printed circuit board, and the second end of the insulative support comprises tapered surfaces configured for insertion into a receptacle connector.

In some embodiments, the body has a first edge and a second edge, opposite the first edge, the at least one contact tail of each of the plurality of contacts extends from the body at the first edge, and the second edge of each of the plurality of contacts is embedded in the insulative support.

In some embodiments, the exterior of the insulative supports comprises a plurality of straight sides and a contact of the plurality of contacts is attached to a respective straight side of the plurality of straight sides.

In some embodiments, the plurality of straight sides bound a rectangular cross section of the insulative support.

In some embodiments, the plurality of straight sides form a hollow rectangular tube.

In some embodiments, the plurality of straight sides bound a square cross section of the insulative support.

In some embodiments, the insulative support comprises a plurality of projections, each of the plurality of projections comprising a distal end and extending from a respective straight side of the plurality of straight sides and each of the plurality of contacts is mounted between the distal end of a projection of the plurality of projections and the respective straight side.

In some embodiments, for at least one of the plurality of straight sides, at least two contacts of the plurality of contacts are attached to the straight side.

In some embodiments, the at least two contacts of the plurality of contacts attached to the straight side are electrically isolated within the electrical connector.

According to aspects of the disclosure, there is provided an electrical assembly, comprising a first substrate, a first electrical connector mounted to the first substrate, a second substrate, and a second electrical connector mounted to the first substrate. The first electrical connector comprises a rectangular opening and a first plurality of electrical contacts comprising mating contact portions extending into the opening and contact tails attached to the first substrate, the second electrical connector comprising an insulative support with a rectangular cross section and a second plurality of electrical contacts mounted to the insulative support and contact tails attached to the second substrate, and the insulative support extends into the rectangular opening such that the mating contact portions of the first plurality of contacts contact the second plurality of electrical contacts.

In some embodiments, the first substrate and the second substrate each comprise conductive structures comprising a first power circuit and a second power circuit, the rectangular opening is bounded by at least a first straight wall, the insulative support comprises a first exterior side, mating contact portions of a first subset and a second subset of the first plurality of electrical contacts extend into the opening through the first straight wall, contact tails of the first subset of the first plurality of electrical contacts are connected to the first power circuit within the first substrate, contact tails of the second subset of the first plurality of electrical contacts are connected to the second power circuit within the first substrate, a first subset and a second subset of the second plurality of electrical contacts are mounted to the first straight wall and mate with the first subset and a second subset of the first plurality of electrical contacts, respectively, contact tails of the first subset of the second plurality of electrical contacts are connected to the first power circuit within the second substrate, and contact tails of the second subset of the second plurality of electrical contacts are connected to the second power circuit within the second substrate.

In some embodiments, the first exterior side is flat.

In some embodiments, the rectangular opening is bounded by at least a second straight wall, the insulative support comprises a second exterior side, a single electrical contact of the second plurality of electrical contacts is mounted to the second exterior side of the insulative support, and at least two of the first plurality of electrical contacts extend into the opening through the second straight wall and mate with the single electrical contact.

According to aspects of the disclosure, there is provided an electrical assembly, comprising a first electrical connector configured to be mounted to a first substrate and a second electrical connector configured to be mounted to a second substrate, wherein the first electrical connector is configured to mate with the second electrical connector and the first electrical connector and the second electrical connector are configured to space the first substrate 6 mm or less from the second substrate when the first electrical connector is mated with the second electrical connector.

In some embodiments, the first electrical connector comprises an opening comprising an entrance configured to introduce the second electrical connector into the opening, the entrance is disposed on a front side of the first substrate, and the first electrical connector is mounted to a rear side of the first substrate.

In some embodiments, the opening extends through the first substrate and the second electrical connector at least partially extends through the first substrate when the first electrical connector is mated with the second electrical connector.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION OF INVENTION

Figure 1A:
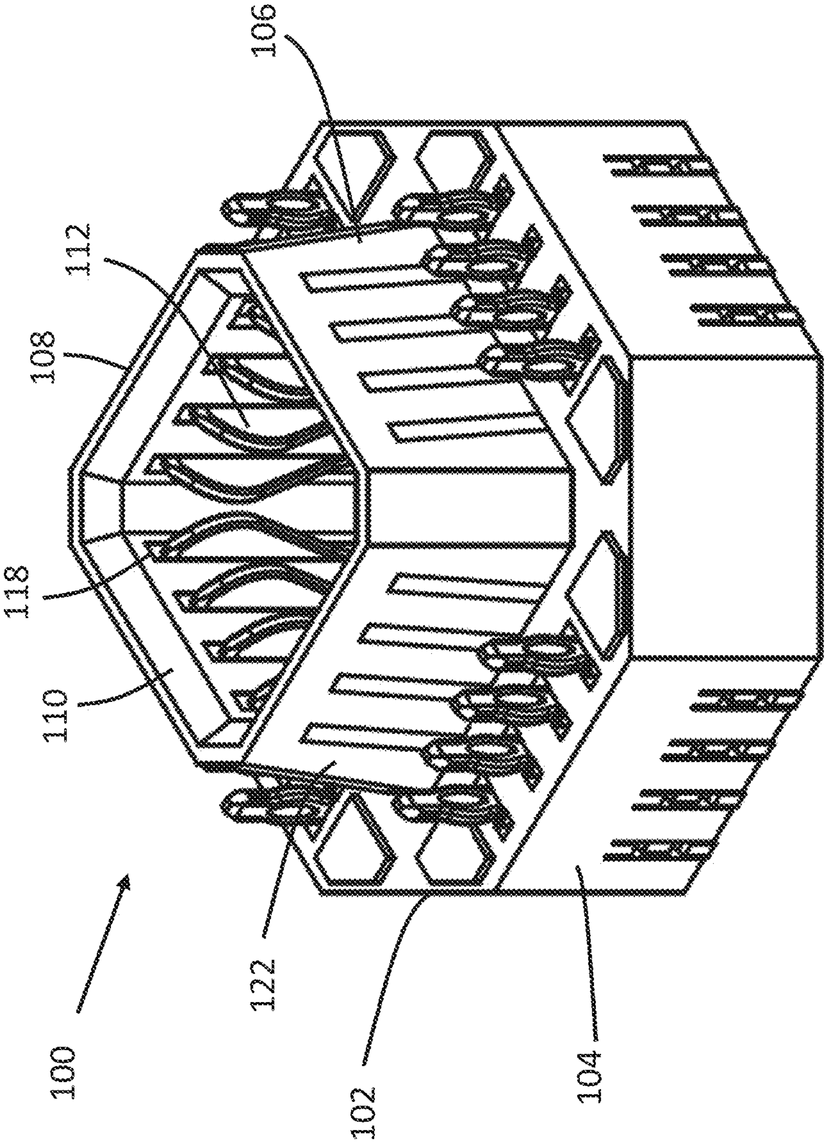
FIG. 1A is a perspective view of an exemplary embodiment of a receptacle electrical connector.

The inventors have recognized and appreciated designs for power connectors that may enable low cost and compact electronic assemblies. Such a connector may serve the same role as conventional receptacle connectors that mate with a metal post to complete a power circuit. Additionally, the connector may be configured to mate with a plug connector with multiple electrically isolated electrical contacts. Subsets of one or more electrical contacts may be connected to respective power circuits. As a result, a single connector may support multiple power circuits in a small space.

In some embodiments, the plug connector may be formed with an insulative support to which are attached multiple electrical contacts. The electrical contacts may be electrically isolated from each other within the plug connector such that each electrical contact may be connected to a different power circuit within an assembly to which the plug is mounted. If a power circuit requires more current flow than can be supported by a single electrical contact, multiple electrical contacts may be attached to the same power circuit.

In some embodiments, each of the electrical contacts may be generally flat. These components may be formed with low cost manufacturing operations. The insulative support, for example, may be formed by a molding operation. The electrical contacts may be formed by stamping a contact from a sheet of metal. In one or a small number of relatively simple operations, a contact body with a contact surface may be formed. Additionally, in the same operations, contact tails and features to engage an insulative support may also be formed.

In some embodiments, the insulative support may have one or more exterior surfaces to which stamped electrical contacts may be attached. For example, the insulative support may have a rectangular cross section with four exterior surfaces to which stamped electrical contacts may be attached. The exterior surface may be flat in some embodiments, with adjacent surfaces positioned in transverse planes. Opposite exterior surfaces may be positioned in parallel planes such that, in some embodiments, the plug may have a parallelepiped, rectangular, or a square cross section.

In some embodiments, a single electrical contact may be mounted to each of the exterior surfaces of the plug. Embodiments are possible, however, in which more than one electrical contact is mounted to some or all of the exterior surfaces of the plug. When multiple electrical contacts are mounted to a side, those electrical contacts may also be electrically isolated within the plug such that the tails of the electrical contacts on the same surface may be connected to the same or different power circuits.

In some embodiments, flexibility may be provided with a plug for which each of the exterior surfaces can receive either a single electrical contact or two or more electrical contacts. In some embodiments, the two electrical contacts may each be configured to approximate half of the single contact.

A receptacle connector for mating with such a plug may likewise be simply constructed. An insulative housing, for example, may be molded, and multiple electrical contacts may be stamped from a sheet of metal. The receptacle housing may have an opening that is bounded by straight walls. The straight walls may be configured to align with exterior surfaces of the plug when the plug is inserted into the opening. One or more electrical contacts may have mating contact portions that extend through each of the straight walls. These electrical contacts may be electrically isolated within the connector such that subsets of one or more of the electrical contacts may be connected to different power circuits within a printed circuit board to which the receptacle connector is mounted.

The receptacle may complete any number of power circuits supported by the plug. For example, all of the electrical contacts within the receptacle mated to the same electrical contact in the plug may be coupled to conductors forming the same power circuit within the PCB to which the receptacle is mounted. In this way, mating the plug to the receptacle may complete any number of power circuits within an electrical assembly.

In addition to conserving space within the electrical assembly by enabling multiple power circuits to be completed to through the same plug and receptacle, miniaturization may also be achieved by enabling circuits to be completed between closely spaced assemblies. In some embodiments, the receptacle and plug when mated may have a low height, requiring relatively small separation between the assemblies connected through the mated plug and receptacle. For example, the plug and receptacle may be mounted to respective parallel printed circuit boards with the connected assemblies. Those printed circuit boards may be separated by a small distance, such as less than 6 mm or 5 mm or less in some embodiments.

The electrical contacts of the plug for example may extend over substantially the entire length of the insulative support in a direction in which the plug is inserted into the receptacle for mating. A small length of the insulative support, tapered for lead-in to the receptacle, may be exposed at the mating end of the plug. An edge of the electrical contacts may be embedded in the insulative support adjacent this tapered portion. An opposite edge of the electrical contact may extend to, or almost to, the mounting interface of the plug. To conserve space that mating or mounted ends of the plug, attachment features may be included in the central portion of the plug surfaces and electrical contacts. For example, a projection from a central portion of a surface of the insulative support may have a distal end shaped to hold the plate-like electrical contact to the surface of the plug. A slot in the electrical contact may engage the projection to secure the electrical terminal to the insulative support. With such mounting, the plug may extend above the surface of a printed circuit board to which it is mounted by a relatively short distance, such as 10 mm or less, or, in some embodiments, less than 7 mm or 6 mm.

Further, the receptacle connector may be configured for mounting to a back side of a first printed circuit board to be connected to a second printed circuit board to which the plug is attached. To support such a mounting, the receptacle may have a base and walls bounding the opening extending from the base. Tails of the electrical contacts of the receptacle may extend from the base. In some embodiments, the tails may extend from a surface of the base in a direction parallel to the central axis of the opening. The tails may extend toward the end of the opening of the receptacle through which the plug enters for mating.

Such a configuration enables the receptacle to be mounted to a first printed circuit board from the side, opposite the side facing a second printed circuit board to which the plug may be attached. The surface of the base may be pressed against the printed circuit board and the extending walls may pass through an opening in the printed circuit board. In some embodiments, the walls may extend through and beyond the circuit board by a relatively small distance, such as 6 mm or less or, in some embodiments less than 5 mm or less than 4 mm. Alternatively or additionally, to support mounting from the back side of printed circuit board, the walls that bound the opening of the receptacle may be slanted inwards, towards a central axis of the opening. Such a configuration may enable easy manufacture of an electronic assembly in which portions of the receptacle are within the first printed circuit board and/or extend from the backside of the first printed circuit board.

With this arrangement, in a mated configuration, the separation between the printed circuit boards to which the plug and receptacle are mounted can be as small as the sum of the distance that the walls of the receptacle extend above the surface of a first printed circuit board and the length of the plug extending from the second printed circuit board that is not inside the opening. As the plug has a relatively short length and most of the plug fits within the opening of the receptacle when the plug and receptacle are mated, this segment of the plug is relatively short. The distance that the walls of the receptacle extend above the first printed circuit board can also be small, leading to a small separation between printed circuit boards.

In some embodiments, a first electrical connector has a housing supporting a first row of electrical contacts arranged along a first line and a second row of electrical contacts arranged along a second line. The second line may be different than the first line and may be transverse to the first line. For example, the second line may be perpendicular to the first line.

In some embodiments, the housing of the first connector further supports a third row of electrical contacts arranged along a third line and a fourth row of electrical contacts arranged along a fourth line. The third line may be different than the first line and the second line and may be transverse to the second line. The fourth line may be different than the first line, the second line, and third line and may be transverse to the third line and the first line. The four rows of contacts may form a shape such as a rectangle, square, or other shape.

In some embodiments, first connector is a receptacle connector, and the housing of the first connector includes a square opening, or an opening of another shape, and the rows of electrical contacts are arranged about a perimeter of the opening.

In some embodiments, a second electrical connector has a housing supporting a first electrical contact arranged along a first line and a second electrical contact arranged along a second line. The second line may be different than the first line and may be transverse to the first line. For example, the second line may be perpendicular to the first line.

In some embodiments, the housing of the second connector further supports a third electrical contact arranged along a third line and a fourth electrical contact arranged along a fourth line. The third line may be different than the first line and the second line and may be transverse to the second line. The fourth line may be different than the first line, the second line, and third line and may be transverse to the third line and the first line. The four contacts may form a shape such as a rectangle, square, or other shape.

In some embodiments, the second connector is a plug, and the housing of the second connector forms a square or other shape, and the electrical contacts are formed about a perimeter of the housing.

In some embodiments, the first connector and the second connector may be included in an electrical assembly. The first electrical connector may be mounted to a first substrate and the second electrical connector may be mounted a second substrate. When the first electrical connector is mated with the second electrical connector, the first electrical connector and the second electrical connector provide a reduced spacing between the first substrate and the second substrate in a mezzanine stacking arrangement. In some embodiments, the reduced spacing between the first substrate and the second substrate may be 6 mm, 5 mm, or less.

The electrical contacts included in each of the first electrical connector and the second electrical connector may be formed by stamping metal. Accordingly, the first connector and the second connector may each be manufactured for a reduced cost. In addition, the first connector and the second connector may be manufactured in multiple different size arrangements that each reuse the same stamped electrical contacts.

In some embodiments, a first row of electrical contacts of the first connector may be configured to mate with a first electrical contact of the second connector as a first contact pairing, while a second row of electrical contacts of the first connector may be configured to mate with a second electrical contact of the second connector as a second contact pairing. In some embodiments, the first electrical contact and the second electrical contact may form four contact pairings as described above.

The first connector and the second connector may each comprise power connectors. Each contact pairing may be coupled with a different electrical power circuit. In some embodiments, each contact pairing may transmit power having different power parameters. For example, two contact pairings may transmit different currents and voltages. Accordingly, different currents and/or voltages may simultaneously be transmitted within a single connector pair formed by the first connector and the second connector. Conventional pin and socket or other conventional power connectors may be limited to transmitting a single current and voltage within a single contact pair.

Referring now to FIGS. 1A-IC, an electrical connector 100 may include an electrically insulative connector housing 102. The insulative material may be formed from a dielectric, such as plastic filled with reinforcing glass fibers. In the illustrated embodiment, connector housing 102 has a generally square shape and a plurality of electrical contacts 112 supported by connector housing 102. Housing 102 has an entrance 108 to an opening 120. Entrance 108 is sized to permit passage of a power plug, such as connector 200, described below, into the opening 120. Housing 102 includes a generally square base portion 104 and a generally square central portion 106 extending from base portion 104. Base portion 104 and central portion 106 together form the opening 120. Although base portion 104 and central portion 106 are shown to be monolithic, it should be appreciated, that such components may be separate from one another. Central portion 106 includes an angled surface 122 where a size of the angled surface 122 becomes smaller along the length of central portion 106 extending away from base portion 104.

Housing 102 is also shown to include an angled surface 110 disposed at entrance 108. Angled surface 110 is configured to locate and center a plug being inserted into connector 100. Entrance 108, the opening 120, and angled surface 110 may be centered about an insertion axis 116. A plug, such as connector 200, may be inserted into connector 100 along the insertion axis 116 at the entrance 108.

Figure 1B:
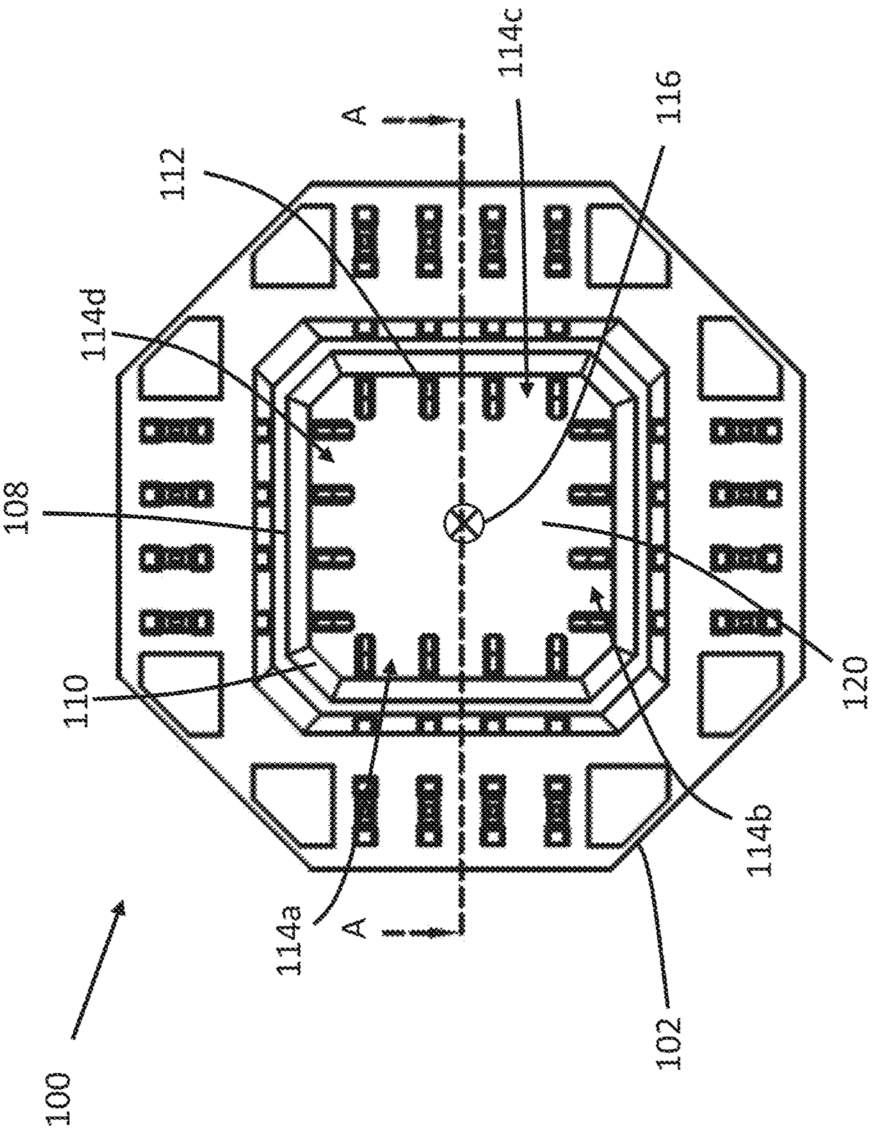
FIG. 1B is a top view of the electrical connector of FIG. 1A.

As shown in FIG. 1B, the plurality of electrical contacts 112 may be arranged in one or more rows of electrical contacts. For example, the plurality of electrical contacts 112 may be arranged in four rows, including first row 114*a*, second row 114*b*, third row 114*c*, and fourth row, 114*d*. The one or more rows may be arranged around an insertion axis 116 of the electrical connector 100. As shown in FIG. 1B, the rows are arranged about a perimeter of entrance 108.

In some embodiments, each row of contacts may be arranged along a line. For adjacent rows of contacts, the lines along which the rows are arranged may be transverse. For example, a line along which row 114*b* is arranged transverse to the lines along which adjacent rows 114*a* and 114*c* are arranged. In some embodiments, the lines may be perpendicular. Accordingly, the four rows of contacts may form a rectangle or square.

Figure 1C:
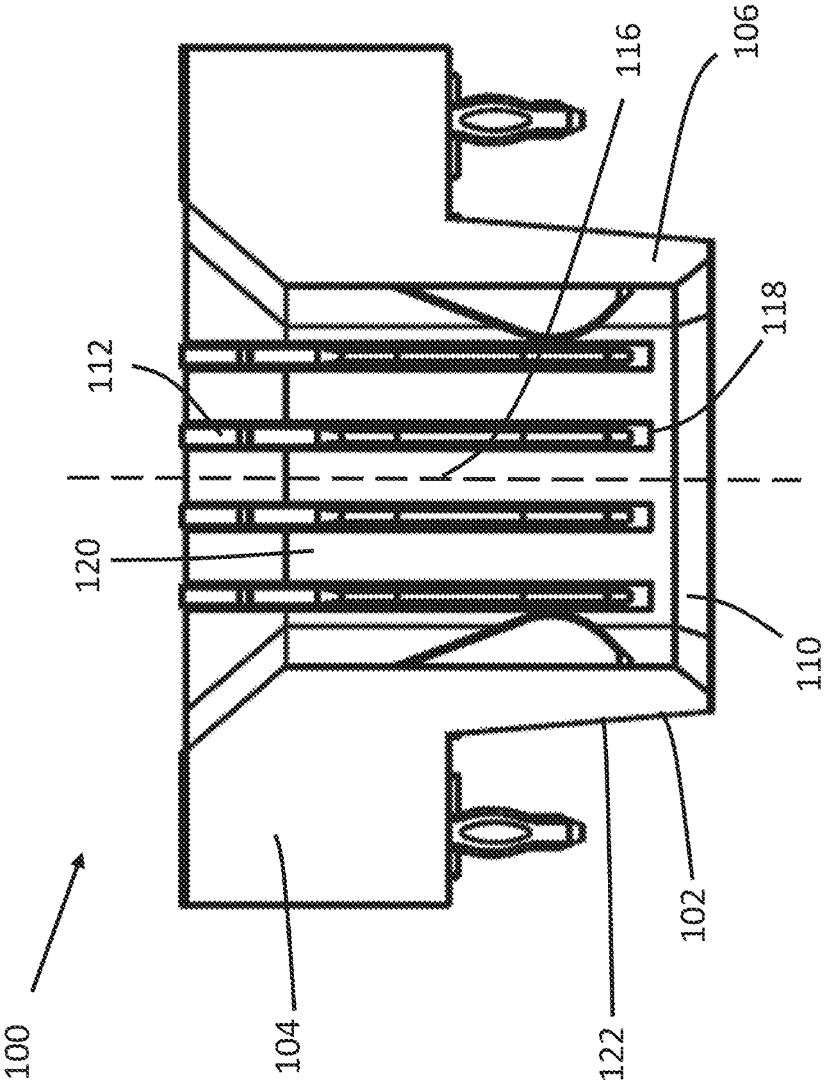
FIG. 1C is a side section view of the electrical connector of FIG. 1A, taken along section line AA in FIG. 1B.
Figure 1D:
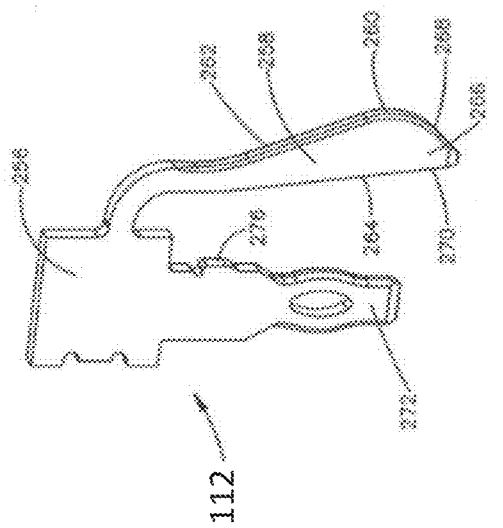
FIG. 1D is a perspective view of an electrical contact of the electrical connector of FIG. 1A.

Referring to FIG. 1D, a single electrical power contact 112 is shown. Contact 112 may be formed as an electrically conductive monolithic body. It should be appreciated, however, that various components of the contact 112 may be separate from one or more other components of the contact. The contact 112 may be constructed in a stamping operation. In such an operation, sheet metal, such as a copper alloy, is stamped to form the contact 112. In one example, a plurality of contacts is formed from a single sheet of material and is supported by a common carrier strip. Thus, the stamped electrical contacts and the carrier strip may be monolithic with each other. The electrical contacts may then be separated from the carrier strip.

As shown in FIG. 1D, the contact 112 may include a base 256 and a contact beam 258 that extends from the base 256. Base 256 and contact beam 258 may be monolithic with each other. The contact beam 258 includes a contact portion 260 that is configured to contact a complementary electrical power contact that is mated with the contact 112. For example, the complementary power contact may be supported by a plug housing of a plug connector, such as connector 200, that is received by a receptacle connector, such as connector 100, that includes the contact 112. The contact portion 260 includes a first side 262 and a second side 264. The first side 262 may be referred to as a first contact side, and the second side 264 may be referred to as a second contact side. The first side 262 may be opposite the second side 264. For instance, the first side 262 may be spaced inward towards the insertion axis 116 with respect to the second side 264 when the contact 112 is supported by connector housing 102. The first and second sides 262 and 264 may further be oriented at an angle relative to each other. For instance, the first side 262 may angled with respect to the second side 264. In one example, the first side 262 may be angled relative to the second side 264 such that the width of contact 112 or the distance from the first side 262 to the second side 264 becomes greater in a direction away from base 256. The first side 262 may flare away from the second side 264 as it extends in a direction away from the base 256.

The contact beam 258 may further include an insertion portion 266 disposed at the end of contact 112 furthest from base 256. Thus, the contact portion 260 may be disposed between the base 256 and the insertion portion 266. The insertion portion 266 may include a first side 268 and a second side 270. The first side 268 may be referred to as a first insertion side, and the second side 270 may be referred to as a second insertion side. The first side 268 may be opposite the second side 270. For instance, the first side 268 may be spaced inward towards the insertion axis 116 with respect to the second side 270 when the power contact is supported by the connector housing 102. The first and second sides 268 and 270 may further be oriented at an angle relative to each other. In one example, the first side 268 may be angled relative to the second side 270 such that the width of contact 112 or the distance from the first side 268 to the second side 270 becomes smaller along the insertion portion 266 in a direction away from base 256. It should thus be appreciated that the first side 262 of the contact portion 260 and the first side 268 of the insertion portion 266 join together at an interface that may be formed by an apex of the contact beam 258.

In FIGS. 1A-1C, connector 100 is shown to include contacts 112 having tails 272 configured for connecting the electrical contact to a printed circuit board. In this example, tails 272 are formed as press fit tails and which extend from base 256 in generally the same direction as contact beams 258, tails 272 extend from base portion 248 in generality the same direction as beams 258.

As shown in FIG. 1C, the housing 102 may include a plurality of slots 118, in which the plurality of contacts 112 may be at least partially disposed. Each contact 112 may be positioned within one of the plurality of slots 118 formed in housing 102. Although contacts 112 may be held within slots 118 in any number of ways, the contacts are shown a toothed surface having one or more teeth 276 for engaging an inner wall within slot 118 in base portion 104 and holding contact 112 in place. It is noted that in order to allow beams 258 to flex upon insertion of a plug into opening 120, the width of slot 118 in central portion 106 permits the movement of beam 258 within the slot. In some embodiments, housing 102 may be formed on contacts 112 by an over-molding operation.

Figure 2A:
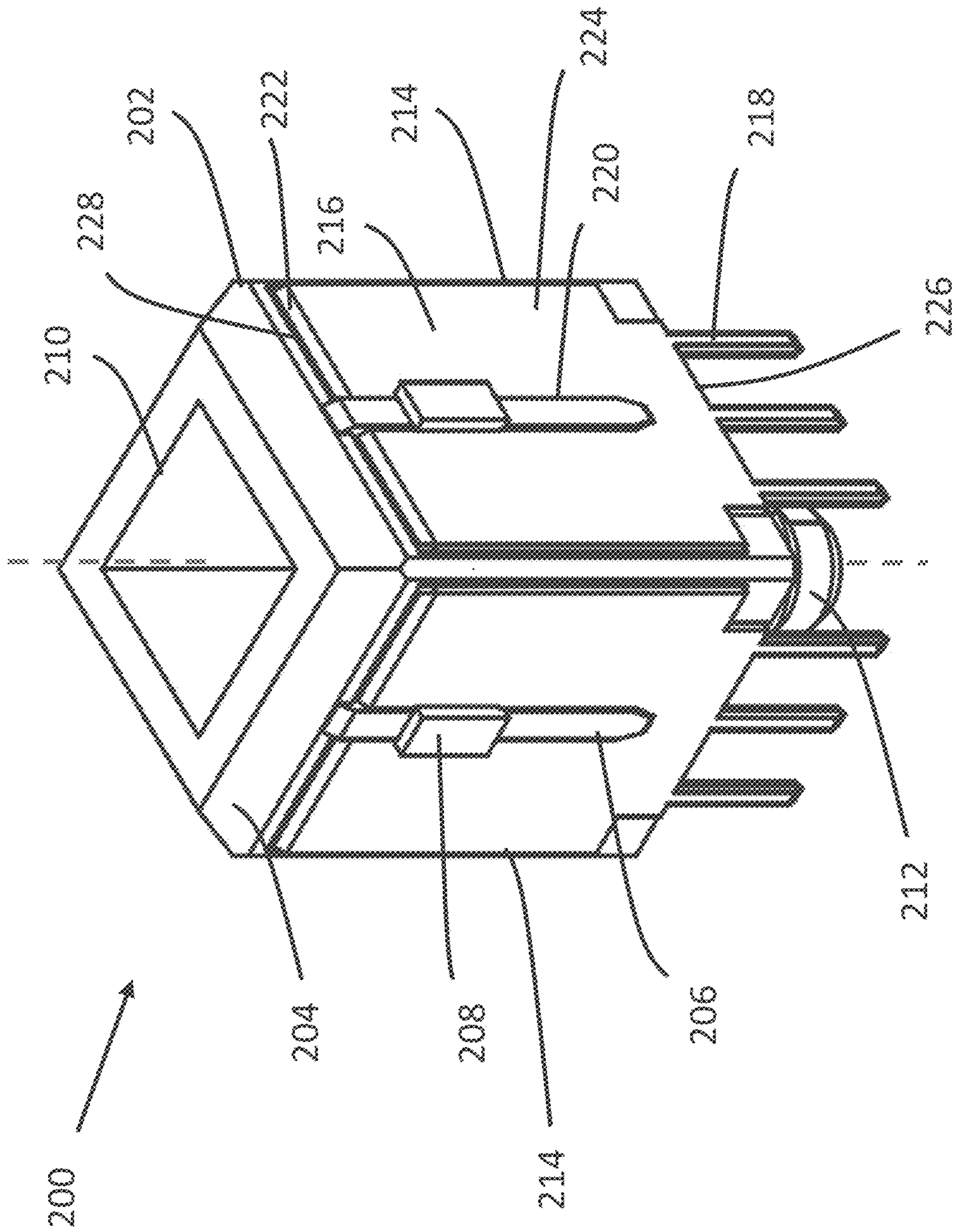
FIG. 2A is a perspective view of an exemplary embodiment of a plug electrical connector, configured to mate with the receptacle electrical connector of FIG. 1A.
Figure 2B:
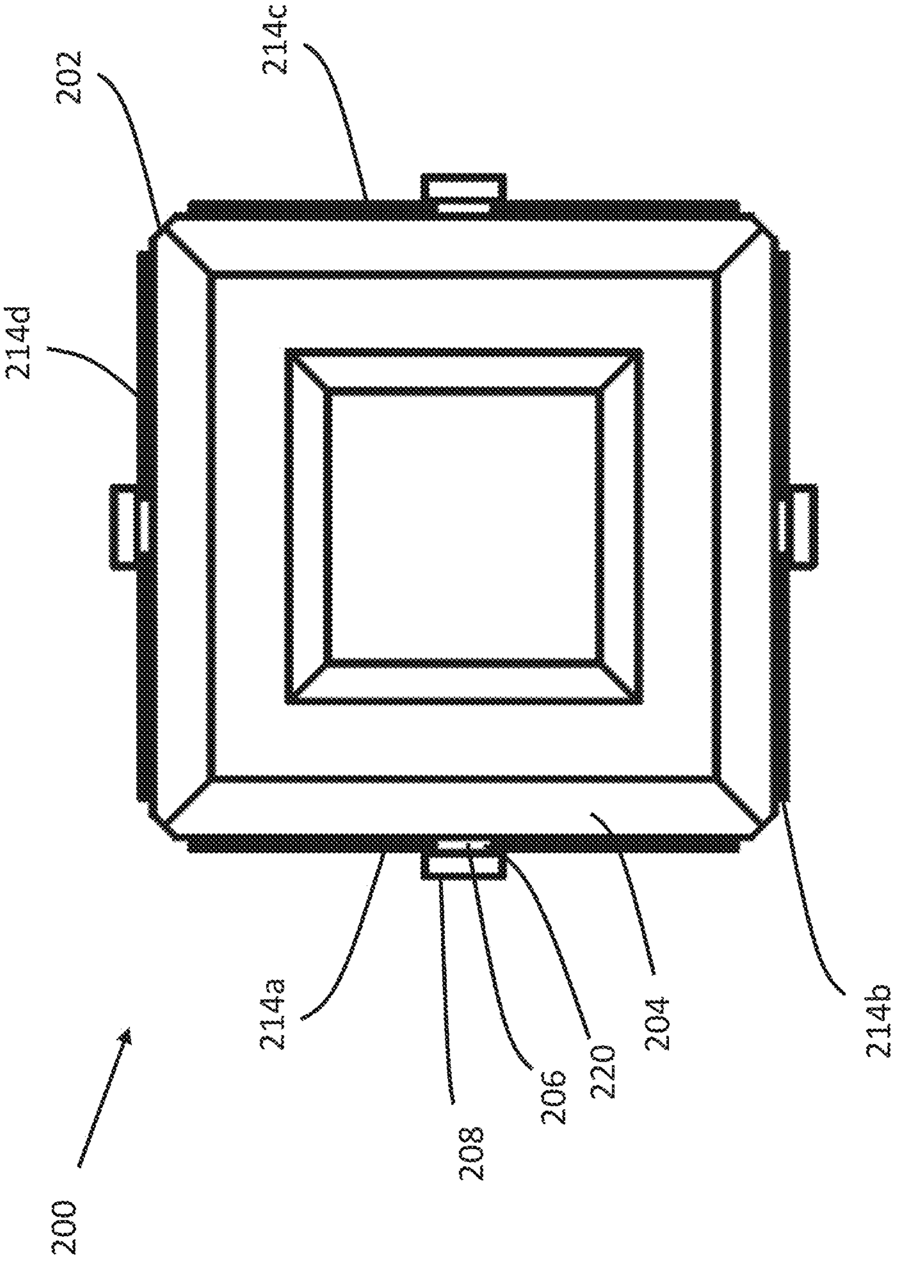
FIG. 2B is a top view of the electrical connector of FIG. 2A.

Referring now to FIGS. 2A-2B, an electrical connector 200 may comprise a plug configured to be received by a receptacle connector, such as the connector 100 described above. Such a plug may be used in scenarios in which a cylindrical metal pin has been used, but may be more economically manufactured and support additional functions of an interconnection system. Connector 200 may include a an electrically insulative connector housing 202 having a generally square shape and a plurality of electrical contacts 214 supported by connector housing 202. Housing 202 includes an angled surface 204. Angled surface 204 is configured to locate and center the connector 200 being inserted into a receptacle connector. Housing 202 may include an opening 210 and a lower portion 212. Opening 210 may reduce cost of the connector 200 by reducing the amount of material required to form housing 202. In some embodiments, opening 210 may increase heat dissipation of connector 200 by increasing the exposed surface area of connector 200. Lower portion 212 may be configured to mount the connector 200 to a substrate, as described below.

As shown in FIG. 2B, the plurality of electrical contacts 214 may be arranged on different exterior surfaces of the housing 202. For example, as shown in FIG. 2B, electrical connector 200 may include four electrical contacts 214*a*, 214*b*, 214*c*, and 214*d*. The electrical contacts may be arranged about a perimeter of housing 202. In some embodiments, two or more of the electrical contacts may be formed from a unitary bent plate instead of from separate contacts. For example, a single stamped metal contact may be bent to form both contact 214*a* and contact 214*b*.

In some embodiments, each contact 214 may be arranged along a line in the plane of the top view of FIG. 2B. For adjacent contacts, the lines along which the contacts are arranged may be transverse. For example, a line along which contact 214*b* is arranged is transverse to the lines along which contacts 214*a* and 214*c* are arranged. In some embodiments, the lines may be perpendicular. Accordingly, the contacts may form a rectangle or square.

Contacts 214 may be formed as an electrically conductive monolithic body. It should be appreciated, however, that various components of the contact 214 may be separate from one or more other components of the contact. The contact 214 may be constructed in a stamping operation. In such an operation, sheet metal, such as a copper alloy, is stamped to form the contact 214. In one example, a plurality of contacts is formed from a single sheet of material and is supported by a common carrier strip. Thus, the stamped electrical contacts and the carrier strip may be monolithic with each other. The electrical contacts may then be separated from the carrier strip.

As shown in FIG. 2A, each contact 214 may include a contact portion 216 and tails 218. The contact portion 216 is configured to mate with contacts 112 of connector 100. For example, the contact portion may mate with four contacts 112 arranged in a row. Adjacent to contact portion 216, contact 214 may include an angled portion 222. Angled portion 222 may be configured to deflect contact beam 258 of contacts 112 when connector 200 is inserted into connector 100. The tails 218 of contact 214 may extend away from contact portion 216 of contact 214. As shown in FIG. 2A, contact 214 may comprise a body 224 having a first edge 226 and a second edge 228. The tails 218 may extend from the body 224 body at the first edge 226. The tails 218 are configured to provide an electrical connection between the contact 214 and an electrical circuit.

Contacts 214 may be supported by the housing 202 by rib 206 and projection 208. As shown in FIG. 2A, each electrical contact 214 includes a slot 220. The slot 220 and rib 206 are sized and shaped such that rib 206 may be inserted into slot 220 to position the contact 214 relative to the housing 202 in a direction lateral to the direction in which the rib 206 and slot 220 extend by physically interfering with the contact moving perpendicular to the rib 206 and slot 220. As shown in FIG. 2B, the projection 208 has a width extending beyond the width of the rib 206 and the slot 220. The rib 208 may position the contact 214 relative to the housing 202 in a direction perpendicular to an outer surface of the housing 202 by physically interfering with the contact 214 from moving away from the housing 202.

Figure 3:
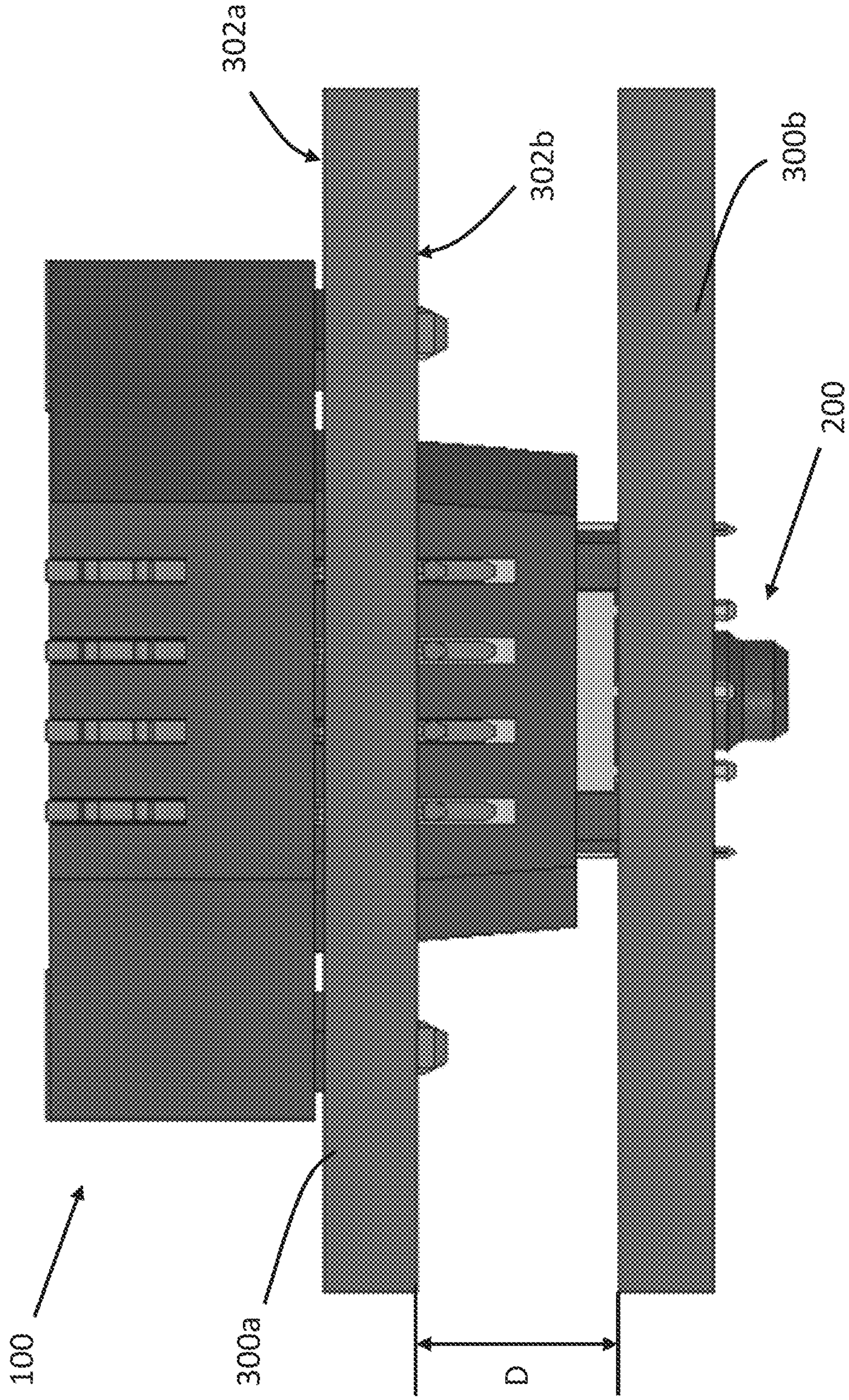
FIG. 3 is a side view of an electrical assembly including the electrical connector of FIG. 1A mated with the electrical connector of FIG. 2A.

Referring FIG. 3, connector 100 is shown mated to connector 200. Connector 100 is shown mounted to first substrate 300*a* and connector 200 is shown mounted to a second substrate 300*b*. The first substrate 300*a* and the second substrate 300*b* may comprise printed circuit boards. In some embodiments, connector 100 is configured to be mounted to a rear side 302*a* of the substrate 300*a* using tails 272 while contact portions 260 of the contacts 112 extend beyond a front side 302*b* of the substrate 300*a* that is opposite the rear side 302*a*.

Central portion 106 of connector 100 extends into substrate 300*a*. As shown in FIG. 3, central portion 106 of connector 100 passes through substrate 300*a*. In some embodiments, contacts 112 may have tails 272 formed as press fit tails, and the connector 100 may be mounted to substrate 300*a* via a number of holes or vias formed in the substrate 300*a*. The size of the holes or vias formed in substrate 300*a* for receiving tails 272 may be formed small enough to permit the press fit tails to at least frictionally engage the inner surface of such holes or vias.

As depicted in FIG. 3, the lower portion 212 of the housing 202 of connector 200 passes through substrate 300*b*. In some embodiments, the lower portion 212 may mount the connector 200 to the substrate 300*b*. In some embodiments, contacts 214 may have tails 218 formed as through hole solder tails, and the connector 200 may be mounted to substrate 300*b* via a number of holes or vias formed in the substrate 300*b*. The size of the holes or vias formed in substrate 300*b* for receiving tails 218 may be formed small enough to permit the tails to engage and/or be soldered to the inner surface of such holes or vias.

In some embodiments, at least one of connector 100 or connector 200 may be assembled onto a substrate using surface mount techniques press fit tails, or though hole soldering, and accordingly connector 100 or connector 200 may include contacts having tails configured for surface mounting, press fit tails, or through hole soldering to a substrate.

As shown in FIG. 3, connector 200 has been inserted through entrance 108 and into opening 120. The dimensions of opening 120 and the distance between pairs of opposed contacts 112 are set so that beams 258 engage the contacts 214 of connector 200 during insertion into opening 120. The contacts 214 of connector 200 are held by the housing 202 of connector 200 and are positioned such that as connector 200 is inserted, the contacts 214 may be wiped by beams 258 of contacts 112 thereby establishing an electrical connection between the contacts 214 and contacts 112. As shown in FIG. 3, connector 200 has been fully inserted into connector 100. As connector 200 is inserted into connector 100, beams 258 are deflected. Since contact 112 may be stamped from metal, the deflection of beams 258 may result in a compression force for beams 258 to return to their initial position. This force contributes to the resulting wiping of beams 258 against the contacts 214 of connector 200 thereby establishing an electrical connection between connector 200 and contacts 112.

As shown in FIG. 3, connector 100 and connector 200 may be configured such that when connector 100 and connector 200 are coupled together, the distance between first substrate 300*a* and second substrate 300*b* in a mezzanine stacking configuration is distance D. In some embodiments, distance D may be less than 6 mm, such as 6 mm, 5 mm, or less.

The configuration of connector 100 and connector 200 may contribute to reducing the distance D between the first substrate 300*a* and the second substrate 300*b*. For example, as noted above, the tails 272 of the contacts 112 in connector 100 may be mounted to a rear side 302*a* of first substrate 100. Mounting connector 100 to a rear side 302*a* of substrate 300*a* may reduce a distance that contact portions 160 of the contacts 112 in connector 100 extend from the substrate 300*a* because a large portion of connector 100 is disposed behind the substrate 100 and does not occupy space between the first substrate 300*a* and the second substrate 300*b*. Furthermore, the opening 120 of connector 100 may extend through the substrate 300*a*, thereby allowing a portion of connector 200 to extend through the substrate 300*a* during mating. Reducing the distance that contact portions 160 of the contacts 112 in connector 100 extend from the substrate 300*a*. and having opening 120 of connector 100 extend through the substrate 300*a* may allow the connector 200 to be inserted further into connector 100, such that substrate 300*a* and substrate 300*b* may be disposed at a distance D of 6 mm, 5 mm, or less.

In some embodiments, each row of contacts of connector 100 may be configured to couple with a particular contact of connector 200. For example, first row 114*a* of electrical contacts of the first connector 100 may be configured to mate with first electrical contact 214*a* of the second connector 200 as a first contact pairing, while second row 114*b* may be configured to mate with second electrical contact 214*b* as a second contact pairing, third row 114*c* may be configured to mate with third electrical contact 214*c* as a third contact pairing, and fourth row 114*d* may be configured to mate with fourth electrical contact 214*d* as a fourth contact pairing. Thus, the contacts of electrical connector 100 and electrical connector 200 may four separate contact pairings. Where a row of contacts includes more than one contact 112, the amount of contact between the connector 100 and the second connector may be increased, increasing the amount of power than may be transferred between the connector 100 and the connector 200.

In some embodiments, at least one of connector 100 and connector 200 may include a projection shaped to prevent mating of the connectors unless the correct rows and contacts are aligned with each other. In some embodiments, the connectors may include markings configured to alert a user of a correct orientation in which to mate the connectors.

In some embodiments, each contact pairing may be coupled with a different electrical circuit, for example, a different electrical power circuit portion. As an example, the first contact pairing of first row 114*a* and first contact 214*a* may be coupled to a first electrical power circuit portion while second row 114*b* and second contact 214*b* may be coupled to a separate second electrical power circuit portion. Further, a third contact pairing of third row 114*c* and third contact 214*c* may be coupled to a third electrical power circuit portion and a fourth contact pairing of fourth row 114*d* and fourth contact 214*d* may be coupled to a first electrical power circuit portion.

Accordingly, the connector pair may be coupled to four separate electrical power circuit portions. In some embodiments, the first electrical power circuit portion may comprise a transmit portion of an electrical power circuit while the second electrical power circuit portion may comprise a return portion of an electrical power circuit such that the first contact pair and second contact pair are coupled to one full electrical power circuit. Accordingly, the connector pair may be coupled to two separate full electric power circuits. In some embodiments, two, three, or four contact pairings may be coupled to a same electrical power circuit portion.

In some embodiments, each contact pairing may be associated with electrical power circuits transfer power having different power parameters and the contact pairings may therefore transmit power having different parameters. In some embodiments, two different contact pairings may simultaneously transfer power having different currents and/or voltages. Within a single connector pair formed by connector 100 and connector 200, power may be transmitted having different currents and/or voltages. Conventional power connectors may be limited to a single current and voltage within a single contact pair.

As one example, in one embodiment, a first contact pairing may transfer power at 50 Amperes and 12 Volts, while a second contact pairing may simultaneously transfer power at 35 Amperes and 48 Volts.

Figure 4:
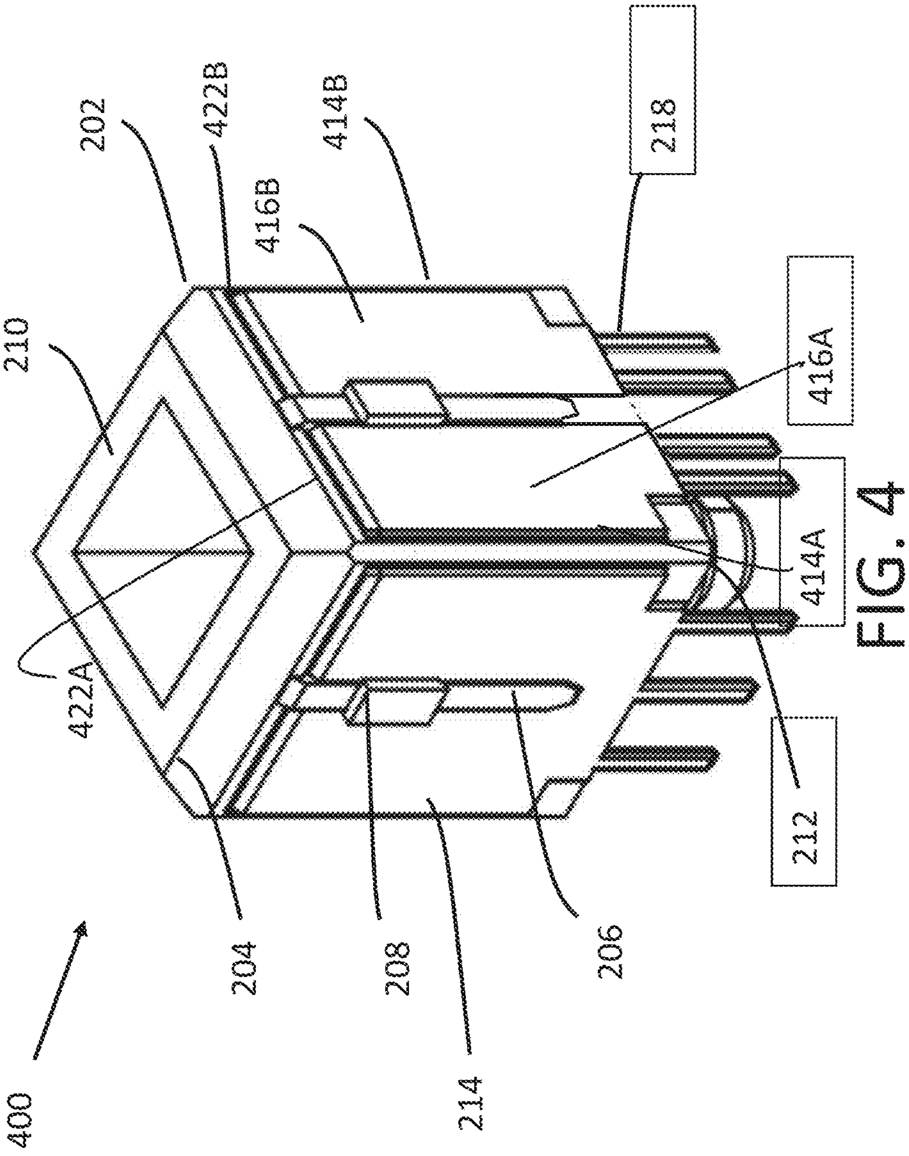
FIG. 4 is a perspective view of an alternative embodiment of a plug electrical connector, configured to mate with the receptacle electrical connector of FIG. 1A.

In other embodiments, there may be a one to many relationship between rows in connector 100 and electrical contacts in plug connector 200. FIG. 4, for example, shows a plug connector 400, which may be constructed using techniques as describe above for connector 200. Connector 400 differs from connector 200 in that multiple electrical contacts are attached to the same exterior surface of the insulative support.

As shown in FIG. 4, connector 400 includes a contact set comprising multiple contacts on one exterior surface of connector 400. A contact set may include multiple contacts on a single exterior surface of the housing 202, in contrast with the single contacts 214 on an exterior surface, as for connector 200 described above in connection with FIGS. 2A and 2B. For example, the contact set illustrated in FIG. 4 includes a first contact 414*a* and a second contact 414*b*. First contact 414*a* includes a first contact portion 416*a* and first angled portion 422*a*. Second contact 414*b* includes a second contact portion 416*b* and a second angled portion 422*b*. Each of first contact 414*a* and second contact 414*b* is illustrated as including two tails 218. First contact 416*a* and 416*b* may each be configured to mate with two contacts 112 in a contact row, in contrast with the contacts 214 which are configured to mate with all four contacts 112 of a contact row of connector 100. First contact portion 216*a* may mate with two contacts 112 and second contact portion 216*b* may mate with two contacts 112. In other embodiments, connector 400 may include a different number of contacts on a single side of connector 400, such as three contacts, four contacts, or another number of contacts.

In some embodiments, each of first contact 414*a* and second contact 414*b* may be coupled to a separate electrical power circuit portion, such as a transmit portion or a return portion. Accordingly, connector 400 may be coupled to between one and eight electrical power circuit portions and may be coupled to between one half and four separate full electric power circuits.

Having thus described at least one embodiment, it is to be appreciated various alterations, modifications, and improvements may readily occur to those skilled in the art. Such alterations, modifications, and improvements are intended to be within the spirit and scope of the application. Accordingly, the foregoing description and drawings are by way of example only. Various changes may be made to the illustrative structures, materials and processes shown and described herein.

For example, certain electrical contacts are shown with connected to a substrate such as a PCB through the use of a pressfit contact tails. Other contact tail configurations, such as surface mount or plated through hole soldered connections may be used instead.

Also, certain walls, surfaces or components are illustrated and/or described as flat or straight. In some embodiments, these walls, surfaces or components may have a curvature to them. An electrical contact mounted to an exterior surface of a plug, for example, may be formed with a simple stamping operation as described above with an introduced curvature.

Examples of arrangements that may be implemented according to some embodiments include the following:

In a first example, an electrical connector may comprise a housing and a plurality of electrical contacts supported by the housing. The plurality of electrical contacts may comprise a first row of electrical contacts arranged along a first line and a second row of electrical contacts arranged along a second line, wherein the second line may be transverse to the first line.

The housing may comprise an opening, the electrical contacts of the first row may comprise mating contact portions extending into the opening, and the electrical contacts of the second row may comprise mating contact portions extending into the opening.

The opening may be rectangular.

The opening may be square.

A surface of the opening may have curvature.

A surface of the opening may be curved.

The electrical connector may be configured to be mounted to substrate having a first side and a second side and the plurality of electrical contacts may be configured to extend from first side of the substrate to the second side of substrate when the electrical connector is mounted to the substrate.

Each electrical contact of the plurality of electrical contacts may comprise a mounting portion and a mating portion, the mounting portion of each electrical contact may be mounted to the first size of the substrate, and the mating portion of each electrical contact may be arranged on the second side of the substrate.

Each electrical contact of the plurality of electrical contacts may comprise a mounting portion and a mating portion and the mounting portion of each electrical contact and the mating portion of each electrical contact may face the same direction.

The electrical connector may be configured to be mounted to a first substrate, the electrical connector may be configured to mate with a complementary electrical connector mounted to a second substrate, and the electrical connector may be configured to space the first substrate 6 mm or less from the second substrate when the electrical connector is mated with the complementary electrical connector.

The first line may be perpendicular to the second line.

The plurality of electrical contacts supported by the housing may further comprise a third row of electrical contacts arranged along a third line, wherein the third line may be transverse to the second line and a fourth row of electrical contacts arranged along a fourth line, wherein the fourth line may be transverse to third line and transverse to the first line.

The first row of electrical contacts, the second row of electrical contacts, the third row of electrical contacts, and the fourth row of electrical contacts may form a rectangle.

The first row of electrical contacts, the second row of electrical contacts, the third row of electrical contacts, and the fourth row of electrical contacts may form a square.

The plurality of electrical contacts may comprise stamped metal electrical contacts.

The first row of electrical contacts may be coupled to a first electrical power circuit and the second row of electrical contacts may be coupled to a second electrical power circuit, wherein the second electrical power circuit may be different than the first electrical power circuit.

The first row of electrical contacts may be configured to pass a first current at a first voltage of the first electrical power circuit and the second row of electrical contacts may be configured to pass a second current at a second voltage of the second electrical circuit, wherein the second current may be different than the first current and/or the second voltage may be different than first voltage.

The electrical connector may comprise a power connector.

The housing may comprise an opening and the first row of electrical contacts and the second row of electrical contacts may be arranged about a perimeter of the opening.

In a second example, an electrical connector may comprise a housing comprising an opening bounded by at least a first straight wall and a second straight wall transverse to the first straight wall and a plurality of electrical contacts supported by the housing and comprising a mating contact portion. The plurality of electrical contacts may comprise a first electrical contact mounted to the first straight wall with the mating contact portion of the first electrical contact extending into the opening and a second electrical contact mounted to the second straight wall with the mating contact portion of the second electrical contact extending into the opening.

The housing may comprise a base and the first straight wall and the second straight wall may extend from the base.

The first electrical contact and the second electrical contact may each comprise a tail configured for connection to a printed circuit board and a mating contact portion configured for contacting a plug inserted in the opening and the contact tails of the first electrical contact and the second electrical contact may extend from the base.

The opening may have a center and the first straight wall and the second straight wall may be inclined towards the center of the opening.

The electrical connector may be configured to be mounted to a first substrate, the electrical connector may be configured to mate with a complementary electrical connector mounted to a second substrate, and the electrical connector may be configured to space the first substrate 6 mm or less from the second substrate when the electrical connector is mated with the complementary electrical connector.

The first line may be perpendicular to the second line.

The plurality of electrical contacts supported by the housing may further comprise a third electrical contact arranged along a third line, wherein the third line may be transverse to the second line and a fourth electrical contact arranged along a fourth line, wherein the fourth line may be transverse to the third line and transverse to the first line.

The first electrical contact, the second electrical contact, the third electrical contact, and the fourth electrical contact may form a rectangle.

The first electrical contact, the second electrical contact, the third electrical contact, and the fourth electrical contact may form a square.

The plurality of electrical contacts may comprise stamped metal electrical contacts.

The first electrical contact may be coupled to a first electrical power circuit and the second electrical contact may be coupled to a second electrical power circuit, wherein the second electrical power circuit may be different than the first electrical power circuit.

The first electrical contact may be configured to transmit a first current and a first voltage of the first electrical power circuit and the second electrical contact may be configured to transmit a second current and a second voltage of the second electrical circuit, wherein the second current may be different than the first current and/or the second voltage may be different than first voltage.

The electrical connector may comprise a power connector.

The first electrical contact and the second electrical contact may be arranged about a perimeter of the housing.

Each of the first electrical contact and the second electrical contact may be a bent unitary plate.

In a third example, an electrical connector may comprise an insulative support comprising a central axis and an exterior a plurality of contacts attached to the exterior of the insulative support. Each of the plurality of contacts may comprises a contact surface facing away from the central axis and at least one contact tail.

The insulative support may be elongated in a first direction, each of the plurality of contacts may comprise a body comprising the contact surface, and the at least one contact tail of each of the plurality of contacts may extend from the body in the first direction.

The insulative support may comprise a first end and a second end, opposite from the first end along the first direction, the first end of the insulative support may comprise a mounting lug configured for mounting to a printed circuit board, and the second end of the insulative support may comprise tapered surfaces configured for insertion into a receptacle connector.

The body may have a first edge and a second edge, opposite the first edge, the at least one contact tail of each of the plurality of contacts may extend from the body at the first edge, and the second edge of each of the plurality of contacts may be embedded in the insulative support.

The exterior of the insulative supports may comprise a plurality of straight sides and a contact of the plurality of contacts may be attached to a respective straight side of the plurality of straight sides.

The plurality of straight sides may bound a rectangular cross section of the insulative support.

The plurality of straight sides may form a hollow rectangular tube.

The plurality of straight sides may bound a square cross section of the insulative support.

The insulative support may comprise a plurality of projections, each of the plurality of projections may comprise a distal end and extending from a respective straight side of the plurality of straight sides, and each of the plurality of contacts may be mounted between the distal end of a projection of the plurality of projections and the respective straight side.

For at least one of the plurality of straight sides, at least two contacts of the plurality of contacts may be attached to the straight side.

A first contact of the at least two contacts may be coupled to a first electrical power circuit portion and a second contact of the at least two contacts may be coupled to a second electrical power circuit portion.

The at least two contacts of the plurality of contacts attached to the straight side may be electrically isolated within the electrical connector.

The contact may be a first contact and the respective straight side may be a first respective straight side and a second contact of the plurality of contacts may be attached to a second respective straight side of the plurality of straight sides.

The first contact may be coupled to a first electrical power circuit portion and may be the second contact is coupled to a second electrical power circuit portion.

In a fourth example, an electrical assembly may comprise a first substrate, a first electrical connector mounted to the first substrate, a second substrate, a second electrical connector mounted to the first substrate. The first electrical connector may comprise a rectangular opening and a first plurality of electrical contacts comprising mating contact portions extending into the opening and contact tails attached to the first substrate. The second electrical connector may comprising an insulative support with a rectangular cross section and a second plurality of electrical contacts mounted to the insulative support and contact tails attached to the second substrate. The insulative support may extend into the rectangular opening such that the mating contact portions of the first plurality of contacts contact the second plurality of electrical contacts.

The first substrate and the second substrate may each comprise conductive structures comprising a first power circuit and a second power circuit, the rectangular opening may be bounded by at least a first straight wall, the insulative support may comprise a first exterior side, mating contact portions of a first subset and a second subset of the first plurality of electrical contacts may extend into the opening through the first straight wall, contact tails of the first subset of the first plurality of electrical contacts may be connected to the first power circuit within the first substrate, contact tails of the second subset of the first plurality of electrical contacts may be connected to the second power circuit within the first substrate, a first subset and a second subset of the second plurality of electrical contacts may be mounted to the first straight wall and mate with the first subset and a second subset of the first plurality of electrical contacts, respectively, contact tails of the first subset of the second plurality of electrical contacts may be connected to the first power circuit within the second substrate, and contact tails of the second subset of the second plurality of electrical contacts may be connected to the second power circuit within the second substrate.

The first exterior side may be flat.

The rectangular opening may be bounded by at least a second straight wall, the insulative support may comprise a second exterior side, a single electrical contact of the second plurality of electrical contacts may be mounted to the second exterior side of the insulative support, and at least two of the first plurality of electrical contacts may extend into the opening through the second straight wall and mate with the single electrical contact.

In a fifth example, an electrical assembly may comprise a first electrical connector configured to be mounted to a first substrate, a second electrical connector configured to be mounted to a second substrate. The first electrical connector may be configured to mate with the second electrical connector and the first electrical connector and the second electrical connector may be configured to space the first substrate 6 mm or less from the second substrate when the first electrical connector is mated with the second electrical connector.

The first electrical connector may comprise an opening comprising an entrance configured to introduce the second electrical connector into the opening, the entrance may be disposed on a front side of the first substrate, and the first electrical connector may be mounted to a rear side of the first substrate.

The opening may extend through the first substrate and the second electrical connector may at least partially extend through the first substrate when the first electrical connector is mated with the second electrical connector.

Terms signifying direction, such as "upwards" and "downwards," were used in connection with some embodiments. These terms were used to signify direction based on the orientation of components illustrated or connection to another component, such as a surface of a printed circuit board to which a termination assembly is mounted. It should be understood that electronic components may be used in any suitable orientation. Accordingly, terms of direction should be understood to be relative, rather than fixed to a coordinate system perceived as unchanging, such as the earth's surface.

Further, though advantages of the present invention are indicated, it should be appreciated that not every embodiment of the invention will include every described advantage. Some embodiments may not implement any features described as advantageous herein and in some instances. Accordingly, the foregoing description and drawings are by way of example only.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method of manufacturing or of using an electrical connector, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the claims, shall have its ordinary meaning as used in the field of patent law.

Also, the phraseology and terminology used herein are for the purpose of description and should not be regarded as limiting. The use of "including," "comprising," "having," "containing," or "involving," and variations thereof herein, is meant to encompass the items listed thereafter (or equivalents thereof) and/or as additional items.

What is claimed is:

1. An electrical connector, comprising:

an insulative housing comprising an opening bounded by at least a first straight wall and a second straight wall transverse to the first straight wall; and a plurality of electrical contacts supported by the insulative housing and comprising a mating contact portion, comprising:

a first electrical contact mounted to the first straight wall with the mating contact portion of the first electrical contact extending into the opening; and a second electrical contact mounted to the second straight wall with the mating contact portion of the second electrical contact extending into the opening, wherein the opening of the insulative housing is configured to extend through a substrate when the electrical connector is mounted to the substrate;

wherein the first electrical contact mounted to the first straight wall is configured to be coupled to a first electrical power circuit;

wherein the second electrical contact mounted to the second straight wall is configured to be coupled to a second electrical power circuit; and wherein the first electrical contact and the second electrical contact are electrically isolated within the electrical connector.

2. The electrical connector of claim 1, wherein:

the insulative housing comprises a base and the first straight wall and the second straight wall extend from the base;

the first electrical contact and the second electrical contact each comprise a tail configured for connection to a printed circuit board and a mating contact portion configured for contacting a plug inserted in the opening;

the contact tails of the first electrical contact and the second electrical contact extend from the base;

the opening has a center; and the first straight wall and the second straight wall are inclined towards the center of the opening.

3. The electrical connector of claim 1, wherein:

the first straight wall is perpendicular to the second straight wall;

the first electrical contact and the second electrical contact are arranged about a perimeter of the opening.

4. The electrical connector of claim 1, wherein:

the opening of the insulative housing is further bounded by a third straight wall and a fourth straight wall;

the third straight wall is transverse to the second straight wall;

the fourth straight wall is transverse to the third straight wall and transverse to the first straight wall; and the plurality of electrical contacts supported by the insulative housing further comprises:

a third electrical contact supported by the third straight wall; and a fourth electrical contact supported by the fourth straight wall.

5. The electrical connector of claim 4, wherein the first straight wall, the second straight wall, the third straight wall, and the fourth straight wall are disposed along sides of a square.

6. The electrical connector of claim 1, wherein:

the first electrical contact is coupled to the first electrical power circuit; and the second electrical contact is coupled to the second electrical power circuit, wherein the second electrical power circuit is different than the first electrical power circuit.

7. The electrical connector of claim 6, wherein:

the first electrical contact is configured to pass a first current and a first voltage of the first electrical power circuit; and the second electrical contact is configured to pass a second current and a second voltage of the second electrical power circuit, wherein the second current is different than the first current and/or the second voltage is different than the first voltage.

8. An electrical connector, comprising:

an insulative support comprising a central axis and an exterior, a plurality of contacts attached to the exterior of the insulative support, wherein each of the plurality of contacts comprises a contact surface facing away from the central axis and at least one contact tail, wherein each of the plurality of contacts comprises a body having a first edge and the at least one contact tail of each of the plurality of contacts extends from the body at the first edge.

9. The electrical connector of claim 8, wherein:

the insulative support is elongated in a first direction;

the body of each of the plurality of contacts comprises the contact surface;

the at least one contact tail of each of the plurality of contacts extends from the body in the first direction;

the insulative support comprises a first end and a second end, opposite from the first end along the first direction;

the first end of the insulative support comprises a mounting lug configured for mounting to a printed circuit board; and the second end of the insulative support comprises tapered surfaces configured for insertion into a receptacle connector.

10. The electrical connector of claim 8, wherein:

the insulative support is elongated in a first direction;

the body of each of the plurality of contacts comprises the contact surface;

the at least one contact tail of each of the plurality of contacts extends from the body in the first direction;

the body has a second edge opposite the first edge; and the second edge of each of the plurality of contacts is embedded in the insulative support.

11. The electrical connector of claim 8, wherein:

the exterior of the insulative support comprises a plurality of straight sides; and a contact of the plurality of contacts is attached to a respective straight side of the plurality of straight sides.

12. The electrical connector of claim 11, wherein:

the plurality of straight sides bound a rectangular cross section of the insulative support; and the plurality of straight sides form a hollow rectangular tube.

13. The electrical connector of claim 11, wherein:

the plurality of straight sides bound a square cross section of the insulative support.

14. The electrical connector of claim 11, wherein:

for at least one of the plurality of straight sides, at least two contacts of the plurality of contacts are attached to the straight side;

the electrical connector is mounted to a printed circuit board comprising a first electrical power circuit and a second electrical power circuit;

a first contact of the at least two contacts is coupled to the first electrical power circuit;

a second contact of the at least two contacts is coupled to the second electrical power circuit; and the at least two contacts of the plurality of contacts attached to the straight side are electrically isolated within the electrical connector.

15. The electrical connector of claim 11, wherein:

the contact is a first contact and the respective straight side is a first respective straight side;

a second contact of the plurality of contacts is attached to a second respective straight side of the plurality of straight sides;

the electrical connector is mounted to a printed circuit board comprising a first electrical power circuit and a second electrical power circuit;

the first contact is coupled to the first electrical power circuit; and the second contact is coupled to the second electrical power circuit.

16. Electrical connection components, comprising:

a first electrical connector configured to be mounted to a first substrate;

a second electrical connector configured to be mounted to a second substrate;

wherein:

the first electrical connector comprises a rectangular opening and a first plurality of electrical power contacts comprising mating contact portions extending into the rectangular opening and contact tails configured to be attached to the first substrate;

the second electrical connector comprises an insulative support with a rectangular cross section and a second plurality of electrical power contacts mounted to the insulative support and contact tails configured to be attached to the second substrate;

the insulative support is configured to extend into the rectangular opening such that the mating contact portions of the first plurality of electrical power contacts contact the second plurality of electrical power contacts, the first plurality of electrical power contacts and the second plurality of electrical power contacts configured to transfer electrical power therebetween at a current of at least 34 Amperes, wherein the second electrical connector is configured to at least partially extend through the first substrate when the first electrical connector is mated with the second electrical connector.

17. The electrical connection components of claim 16, in combination with the first substrate and the second substrate, wherein:

the first electrical connector is mounted to the first substrate;

the second electrical connector is mounted to the second substrate;

the first substrate and the second substrate each comprise conductive structures comprising a first power circuit and a second power circuit;

the rectangular opening is bounded by at least a first straight wall;

the insulative support comprises a first exterior side;

mating contact portions of a first subset and a second subset of the first plurality of electrical power contacts extend into the rectangular opening through the first straight wall;

contact tails of the first subset of the first plurality of electrical power contacts are connected to the first power circuit within the first substrate;

contact tails of the second subset of the first plurality of electrical power contacts are connected to the second power circuit within the first substrate;

a first subset and a second subset of the second plurality of electrical power contacts are mounted to the first straight wall and mate with the first subset and a second subset of the first plurality of electrical power contacts, respectively;

contact tails of the first subset of the second plurality of electrical power contacts are connected to the first power circuit within the second substrate; and contact tails of the second subset of the second plurality of electrical power contacts are connected to the second power circuit within the second substrate.

18. The electrical connection components of claim 17, wherein:

the rectangular opening is bounded by at least a second straight wall;

the insulative support comprises a second exterior side;

a single electrical power contact of the second plurality of electrical power contacts is mounted to the second exterior side of the insulative support; and at least two of the first plurality of electrical power contacts extend into the rectangular opening through the second straight wall and mate with the single electrical power contact.

19. The electrical connection components of claim 16, wherein:

the first electrical connector and the second electrical connector are configured to space the first substrate 6 mm or less from the second substrate when the first electrical connector is mated with the second electrical connector.

20. The electrical connection components of claim 19, wherein:

the rectangular opening of the first electrical connector comprises an entrance configured to introduce the second electrical connector into the rectangular opening;

the entrance is configured to be disposed on a front side of the first substrate;

the first electrical connector is configured to be mounted to a rear side of the first substrate; and the rectangular opening is configured to extend through the first substrate.

21. An electrical connector, comprising:

an insulative support comprising a central axis and an exterior, a plurality of contacts attached to the exterior of the insulative support, wherein each of the plurality of contacts comprises a contact surface facing away from the central axis and at least one contact tail, wherein:

the insulative support comprises a first end and a second end, opposite from the first end;

the first end of the insulative support comprises a mounting lug configured for mounting to a printed circuit board; and the second end of the insulative support comprises tapered surfaces configured for insertion into a receptacle connector.

* * * * *